United States Patent [19]

Stewart

[11] Patent Number: 5,313,129

[45] Date of Patent: May 17, 1994

[54] SLEEVE BEARING GROUND LEAD FOR MOTORS

[75] Inventor: Timothy J. Stewart, Akron, Ohio

[73] Assignee: Ametek Technical Motor Division, Kent, Ohio

[21] Appl. No.: 102,192

[22] Filed: Aug. 5, 1993

[51] Int. Cl.$^5$ .............................................. H02K 5/16
[52] U.S. Cl. ..................................... 310/90; 310/71; 384/9; 384/627
[58] Field of Search ............... 310/90, 71; 384/9, 227, 384/448, 624, 627; 361/1, 23

[56] References Cited

U.S. PATENT DOCUMENTS

| | | | |
|---|---|---|---|
| 3,501,204 | 3/1970 | Schreffler | 384/9 |
| 4,320,431 | 3/1982 | Bell | 361/1 |
| 4,434,448 | 2/1984 | Bell et al. | 384/624 |
| 4,798,984 | 1/1989 | Suzuki et al. | 310/90 |
| 5,080,195 | 1/1992 | Mizumoto et al. | 384/448 |

FOREIGN PATENT DOCUMENTS

| | | | |
|---|---|---|---|
| 3121332 | 12/1982 | Fed. Rep. of Germany | 310/90 |
| 3741678 | 6/1989 | Fed. Rep. of Germany | 310/90 |
| 0875514 | 10/1981 | U.S.S.R. | 310/90 |

*Primary Examiner*—Steven L. Stephan
*Assistant Examiner*—Clayton E. LaBalle
*Attorney, Agent, or Firm*—Renner, Kenner, Greive, Bobak, Taylor & Weber

[57] ABSTRACT

A ground lead connection is provided to electrically ground a motor armature shaft. In one embodiment the device has a motor housing in which is mounted a bearing. An armature shaft is journaled in the bearing and a ground lead is attached to the bearing. The bearing is provided with a counter bore socket which receives a terminal from the ground lead. The terminal includes a ferrule and a plug which has flared fingers. When connected, the plug engages the bore of the socket and the fingers engage the counter bore to permanently prevent removal of the terminal from the socket. The shaft is thereby grounded via the bearing without the need for numerous parts.

5 Claims, 2 Drawing Sheets

SLEEVE BEARING GROUND LEAD FOR MOTORS

TECHNICAL FIELD

The invention herein resides in the art of electrical ground leads and, more particularly, to electrical ground leads for grounding motor shafts. Specifically, the invention pertains to such a ground lead that is directly secured to a sleeve bearing in which the shaft is journaled.

BACKGROUND ART

It is well known that electric motor installations often require that the motor shaft be electrically grounded. Such is desirable to prevent the flow of electrical current through the shaft to power transmission equipment, fans, work pieces, and the like which are attached to the motor in the event that a short circuit occurs inside the motor. Previously, it has been known to attach a ground lead to the stator laminations by means of a ground standoff or boss which is welded onto the laminations. The ground lead is in turn attached to the boss by a screw or rivet. It should be apparent that in order to ground the shaft, using this method, it is necessary to effect a connection between the stator and the shaft. This is typically accomplished by a copper strap which contacts the laminations and also contacts the sleeve bearing in which the shaft is journaled. As can be seen, such a prior art structure requires a number of parts and manufacturing steps simply to effect an adequate ground. Accordingly, the prior art techniques and structure have been both labor intensive and costly to manufacture.

There is clearly a need in the art for a ground lead for a motor shaft which is easy to connect and which can consistently provide suitable grounding without the need for numerous parts and labor intensive assembly techniques.

DISCLOSURE OF INVENTION

In light of the foregoing, it is a first aspect of the invention to provide a ground lead for grounding a motor shaft.

Another aspect of the invention is the provision of a ground lead which connects directly to the sleeve bearing of the motor shaft.

Yet a further aspect of the invention is the provision of a ground lead which provides suitable ground connection without the need for extra fasteners, contacts, and the like.

Still a further aspect of the invention is the provision of a ground lead which is inexpensive to manufacture and easy to use, while being reliable and durable in operation.

The foregoing and other aspects of the invention which will become apparent as the detailed description proceeds, are achieved by the improvement in a ground lead connection for a motor, comprising: a motor housing; a bearing mounted in said motor housing; an armature shaft journaled in said bearing; and grounding means for said armature shaft connected to said bearing.

Other aspects of the invention are obtained by the improvement in a ground lead connection for a motor, comprising: a motor housing; a sleeve bearing having a socket mounted in said motor housing; an armature shaft journaled in said sleeve bearing; and grounding means comprising an insulated wire and a terminal, said terminal engaging said socket to ground said armature shaft.

BRIEF DECSRIPTION OF DRAWINGS

For a complete understanding of the objects, techniques and structure of the invention, reference should be made to the following detailed description and accompanying drawings wherein.

BEST MODE FOR CARRYING OUT THE INVENTION

Figure 1:
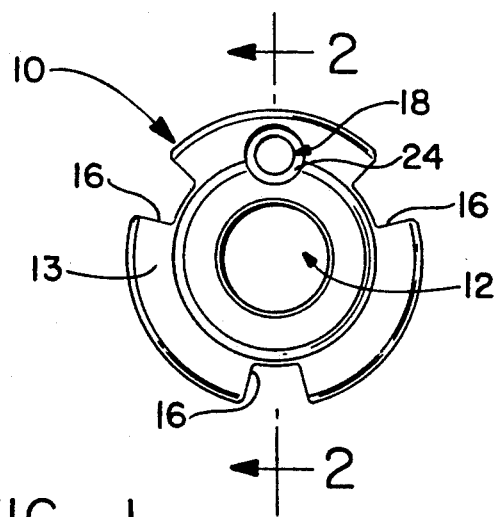
FIG. 1 is a front elevational view of the sleeve bearing according to the invention.
Figure 2:
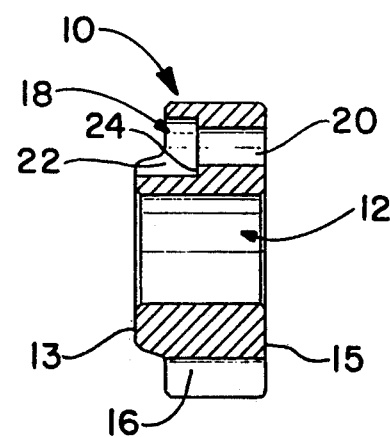
FIG. 2 is a cross sectional view of the sleeve bearing of FIG. 1 taken along the line 2—2.

Referring now to the drawings and more particularly to FIGS. 1 and 2, it can be seen that the sleeve bearing according to the invention is designated generally by the numeral 10. As can be seen, the bearing 10 is of a conventional annular shape and includes a central bore 12, a front face surface 13, a peripheral outer surface 14 having a plurality of radial locking notches 16 therein, and a rear face 15. As shown, the radial locking notches 16 are uniformly spaced at regular intervals around the outer surface 14 of the bearing 10.

Additionally, the bearing 10 includes a ground lead socket 18. The socket 18 is defined by a bore 20 extending from the rear face 15 and a counter bore 22 extending from the front face 13. For reasons which will become apparent as the description continues, the diameter of bore 20 is substantially equal to that of the ground lead terminal to be described. The counter bore 22 is slightly larger in diameter than bore 20 and is concentric therewith.

With reference now to FIG. 2, it can be seen that counter bore 22 forms a ring seat or lip 24 relative to bore 20. The positional depth of seat 24 is dictated by the length of the ground lead terminal yet to be described.

Figure 3:
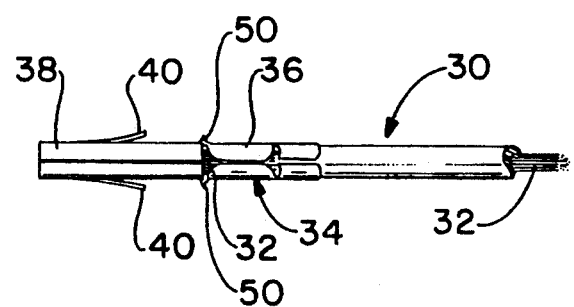
FIG. 3 is an elevational view of the ground lead according to the invention.

With reference now to FIG. 3, a representative ground lead according to the invention can be seen as designated generally by the numeral 30. The ground lead 30 is comprised generally of a conventional insulated electric wire 32 and a crimp terminal 34. As should be apparent to those skilled in the art, wire 32 and terminal 34 can be manufactured from any conventional electrically conductive material such as copper or aluminum. The terminal 34 is comprised of a ferrule 36 and a plug 38. In the preferred embodiment ferrule 36 is crimped onto wire 32 by using an appropriate crimping tool. Accordingly, a positive connection is made between the wire 32 and the terminal 34. As should be appreciated to those skilled in the art, terminal 34 could be connected to wire 32 by means other than crimping, such as soldering, and still satisfy the purpose of the invention. The ferrule 36 has a plurality of flared stops or tabs 50 which are formed when the ferrule 36 is crimped onto the wire 32. The plug 38 is characterized by a plurality of flared retaining fingers or tabs 40. Fingers 40 are formed by an appropriate staking process, having one end flared toward the ferrule 36 and the other remaining integral with the plug 38. Accordingly, the fingers or tabs 40 define deflectable spring members.

Figure 4:
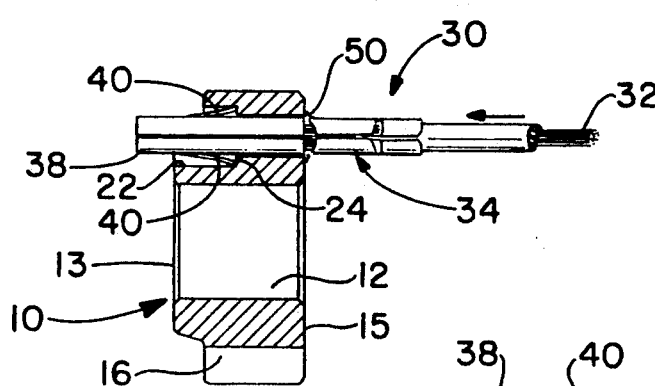
FIG. 4 is a cross sectional view of the sleeve bearing of FIG. 1 taken along the line 2—2 with the ground lead connected.
Figure 5:
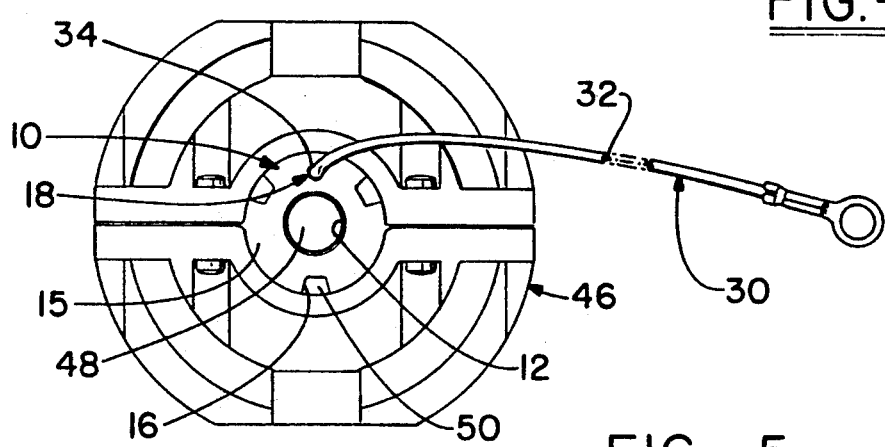
FIG. 5 is a rear end elevational view of the motor assembly with the ground lead connected.
Figure 6:
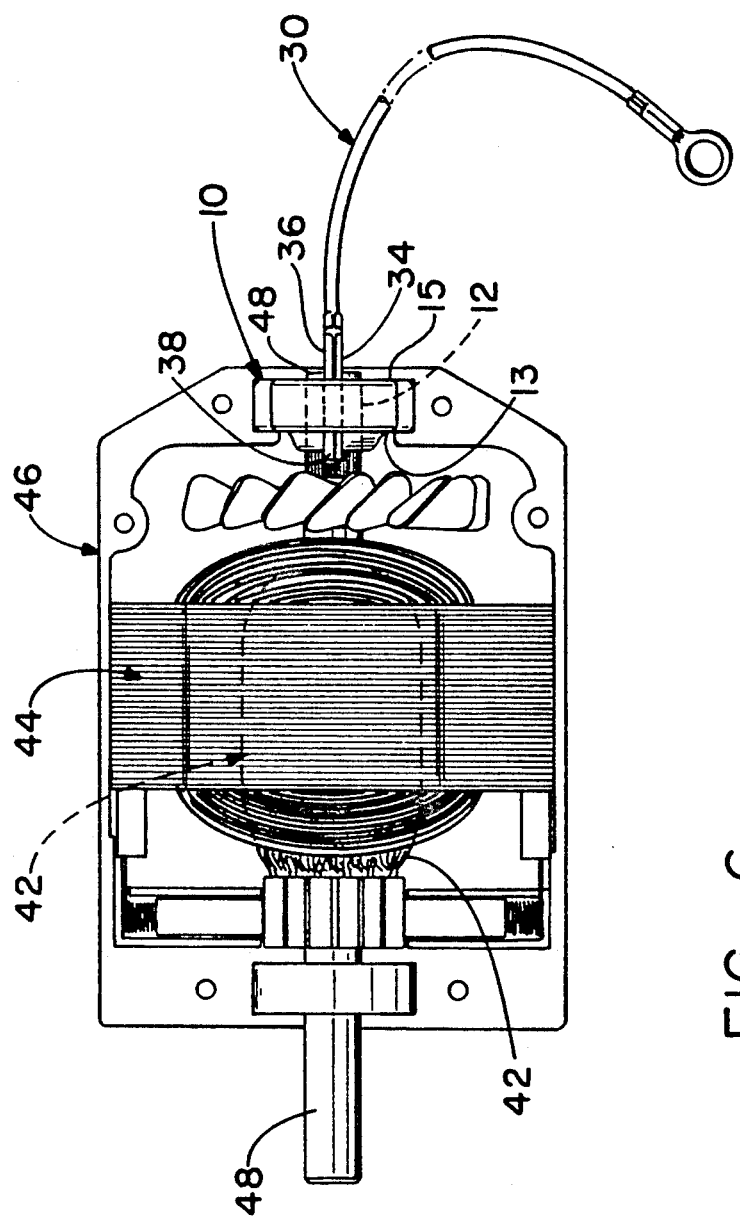
FIG. 6 is a longitudinal top view of the motor assembly of FIG. 5 with a cover removed.

With reference to FIGS. 4-6, assembly of the device according to the preferred embodiment is accomplished by first mounting the motor armature 42 and stator 44 in the motor housing 46 so that the motor shaft 48 is journaled in the bore 12 of the sleeve bearing 10. Accordingly, locking notches 16 engage mating protrusions 50 in the motor housing 46 to prevent rotation of the bearing 10 relative to the housing 46. Grounding of the motor shaft 48 may now be accomplished by inserting terminal 34 into socket 18. During such insertion, the bore 20 compresses the spring fingers 40 flush with the plug 38. As the free ends of the fingers 40 pass beyond the seat or lip 24, they spring outwardly against the sidewalls of the counterbore 22. The flared stops 50 will contact the bearing rear face 15 at such time and prevent further penetration of the terminal 34 into the socket 18. The fingers 40, engaging seat 24, permanently prevent removal of the terminal 34 from the socket 18. As can be seen the dimension from the bearing rear face 15 to the seat 24 must be equal to or slightly less than the dimension from the flared ends of fingers 40 to the ferrule 36. Similarly, the diameter of plug 38 must be substantially equal to the diameter of bore 20, so as to provide a snug electrical connection. It is also contemplated that the plug 38 may be tapered and split to provide a compressive fit within the bore 20.

It should be apparent to those skilled in the art that means other than the flared stops 50 may be provided to prevent further penetration into the socket 18, such as a ferrule 36 which is of a larger diameter than the bore 20. Once connection has been made between the bearing 10 and ground lead 30 the free end of the lead 30 may be connected to an appropriate ground. As is apparent the bearing 10 must be manufactured from an electrically conductive material in order to effect a proper grounding of the shaft. Any lubricants should also be electrically conductive. Once such assembly is accomplished the shaft is electrically grounded and otherwise accomplishes the objects of the invention.

It will be appreciated that the interconnection of the terminal 34 with the socket 18 is permanent. In other words, once engaged, any removal of the terminal 34 from the socket 18 is destructive of the terminal.

Thus it can be seen that the objects of the invention have been satisfied by the structure presented above.

While in accordance with the patent statutes only the best mode and preferred embodiment of the invention has been presented and described in detail, it is to be understood that the invention is not limited thereto or thereby. Accordingly, for an appreciation of the invention, reference should be made to the following claims.

What is claimed is:

1. In a ground lead connection for a motor, the improvement, comprising:
   a motor housing;
   a sleeve bearing mounted in said housing, said sleeve bearing having a socket comprising a bore and a counter bore concentric with said bore, said counter bore forming a seat relative to said bore;
   an armature shaft journaled in said bearing; and
   grounding means for said armature shaft received within said socket and connected to said bearing.

2. The improvement in a ground lead connection as recited in claim 1, wherein said grounding means comprises an insulated wire and a terminal.

3. The improvement in a ground lead connection as recited in claim 2, wherein said terminal comprises a ferrule and a plug, said plug having a plurality of flared fingers projecting therefrom and said ferrule has at least one flared stop.

4. The improvement in a ground lead connection as recited in claim 3, wherein said terminal is inserted in said socket, said plug engages said bore, and said fingers engage said seat, permanently preventing removal.

5. In a ground lead connection for a motor, the improvement, comprises:
   a motor housing;
   a sleeve bearing mounted in said motor housing, said sleeve bearing having a socket comprising a bore and a counter bore concentric with said bore, said counter bore forming a seat relative to said bore;
   an armature shaft journaled in said sleeve bearing; and
   grounding means comprising an insulated electric wire and a terminal,
   said terminal engaging said socket to ground said shaft, said terminal comprising a ferrule and a plug, said plug having a plurality of flared fingers, and said ferrule having at least one flared stop, said plug engaging said bore and said fingers of said seat whereby removal of said terminal from said socket is permanently prevented.

* * * * *